United States Patent [19]

Svengren et al.

[11] Patent Number: 4,640,670
[45] Date of Patent: Feb. 3, 1987

[54] PREPARATION OF A ROLLED PASTRY PRODUCT

[75] Inventors: Anders G. Svengren, Ängelholm; Bertil A. Ganrot, Bjuv, both of Sweden

[73] Assignee: Nestec S.A., Vevey, Switzerland

[21] Appl. No.: 861,538

[22] Filed: May 9, 1986

Related U.S. Application Data

[62] Division of Ser. No. 640,700, Aug. 14, 1984, Pat. No. 4,600,595.

[30] Foreign Application Priority Data

May 2, 1984 [EP] European Pat. Off. ........ 84104918.2

[51] Int. Cl.[4] .................. B29C 53/02; A21C 5/00; A21C 11/10
[52] U.S. Cl. .................. 425/142; 99/450.1; 99/450.4; 99/450.7; 99/537; 425/289; 425/302.1; 425/383
[58] Field of Search ................ 425/142, 297, 302.1, 425/308, 383, 315, 289; 99/450.1, 450.4, 450.5, 450.6, 450.7, 537

[56] References Cited

U.S. PATENT DOCUMENTS 2,478,885  8/1949  Alvey ........................ 425/301
4,517,785  5/1985  Masuda ..................... 99/450.6

Primary Examiner—Willard E. Hoag
Attorney, Agent, or Firm—Vogt & O'Donnell

[57] ABSTRACT

Apparatus for preparing a rolled pastry product in which a sheet of pastry material advancing on a conveyor belt is cut and folded into discrete pieces of a predetermined size and then rolled characterized in that the cutting and folding operation is carried out by an oscillating knife positioned above the conveyor belt and having a cutting edge extending laterally across the width of the conveyor belt, which immediately after contacting and cutting through the advancing pastry sheet by means of its cutting edge, ascends and rotates in a direction such that the motional vector of the cutting edge is counter to the conveying direction causing the forward edge of the pastry sheet to be lifted up and folded over, and then descends and rotates in the reverse direction so that the cutting edge contacts and cuts through the advancing pastry sheet behind the folded portion to separate a folded piece from the remainder of the pastry sheet.

10 Claims, 1 Drawing Figure

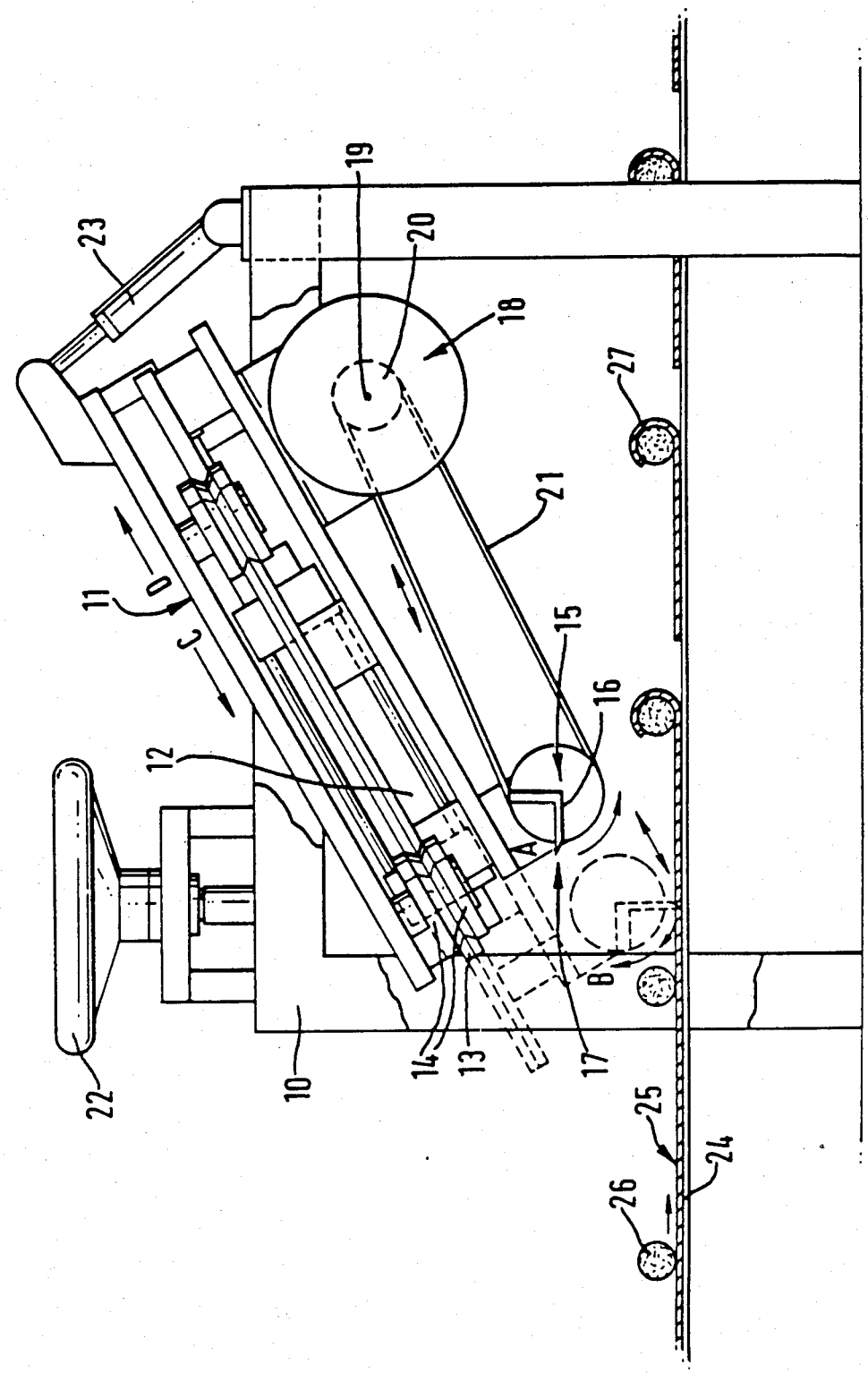

PREPARATION OF A ROLLED PASTRY PRODUCT

This is a divisional of application Ser. No. 06/640,700, filed Aug. 14, 1984, now U.S. Pat. No. 4,600,595.

The present invention relates to a process for preparing a rolled pastry product, especially for cutting and rolling sheets of pastry material advancing on a conveyor belt.

In the preparation of rolled pastry products on a conveyor belt, such as pancakes or Swiss rolls, three distinct operations are required:

(1) distributing or dividing the pastry into discrete pieces of a predetermined size e.g. by means of a cutting mechanism or a dispenser (2) lifting up at least one edge to form a partially folded product (3) rolling the folded product.

Each of these three operations is carried out in a separate step and often complex folding devices are used which are not easy to maintain or clean.

We have developed a process where the cutting and folding operations are carried out in a single step using a rotatable knife which is easy to maintain and clean.

Accordingly, the present invention provides a process for preparing a rolled pastry product in which a sheet of pastry material advancing on a conveyor belt is cut and folded into discrete pieces of a predetermined size and then rolled characterised in that the cutting and folding operation is carried out by an oscillating knife positioned above the conveyor belt and having a cutting edge extending laterally across the width of the conveyor belt, which immediately after contacting and cutting through the advancing pastry sheet by means of its cutting edge, ascends and rotates in a direction such that the motional vector of the cutting edge is counter to the conveyor direction causing the forward edge of the pastry sheet to be lifted up and folded over, and then rotates in the reverse direction and descends so that the cutting edge contacts and cuts through the advancing pastry sheet behind the folded portion to separate a folded piece from the remainder of the pastry sheet.

A plurality of cut and folded pieces of pastry material may be produced from the sheet of pastry material advancing on the conveyor belt by the knife repeating this oscillating movement. Thus, when the knife ascends and rotates so that the motional vector of the cutting edge is counter to the conveying direction, the forward edge of the advancing pastry sheet immediately behind the previously cut and separated folded piece is lifted up and folded over and when the knife reverses its direction of rotation again so that the cutting edge contacts and cuts through the advancing pastry sheet behind the folded portion, another folded piece is separated. By repeating this movement, several folded pieces of pastry product are formed which may afterwards be rolled by conventional methods e.g. on a conveyor provided with a roller. The knife is conveniently fixed on a shaft mounted laterally across the width of the conveyor belt. Means for oscillating the shaft are provided, for example, by an air cylinder. The angle through which the knife rotates should be sufficient to cause the forward edge of the pastry sheet to be lifted up and folded over and is usually at least 60° preferably at least 75°. The maximum angle through which the knife rotates is not critical but practically is not more than 180° and preferably not more than 120°.

Advantageously, the sheet of pastry material advances continuously along the conveyor belt and in this case, when the knife ascends and rotates to cause the forward edge of the pastry sheet to be lifted up and folded over, it also conveniently travels in the conveying direction, preferably at a speed slightly slower than the speed of the sheet of pastry material. This movement of the knife may be achieved by the oscillating shaft being fitted on a movable carriage which reciprocates so that, when the knife rotates in the direction in which the motional vector of the cutting edge, when it is immediately above the conveyor belt, is counter to the conveying direction, it simultaneously travels in the conveying direction at an angle inclined upwards relative to the conveyor belt, and when the knife rotates in the reverse direction, it simultaneously travels in the opposite direction. The angle at which the movable carriage reciprocates relative to the conveyor belt is conveniently from 10° to 50° and preferably from 20° to 40°.

The process of the present invention is particularly applicable to the production of rolled filled pastry products especially batter based products such as pancakes. The filling is placed at intervals on the pastry sheet as it travels along the conveyor belt, preferably by extrusion e.g. by a volumetric piston filler, advantageously at spaced positions just behind the places where the edges will be formed when the pastry sheet is cut by the knife. In this position, when the knife has cut the pastry sheet and rotates counter to the direction of motion of the pastry sheet the forward edge of the pastry sheet is lifted up and folded over the filling.

The control of the knife is closely synchronised with the movement of the pastry sheet on the conveyor belt, preferably by an electronic processor. Where a filled product is being made, a signal may be sent to the knife, for example, by the filling activating a photocell.

After the folding operation, the folded pieces are transferred to the rolled device which comprises a separate conveyor provided with a roller mounted transversely above the conveyor belt. The conveyor belt of the rolling device preferably runs at a higher speed than the belt of the cutting and folding device in order to increase the distance between the folded pieces to that required for the rolling operation. By the method of this invention, the folded part of the pastry sheet covers the filling and can thus prevent contact between the filling and the final rolling device, thus ensuring that the rolling device remains clean.

In the preparation of pancakes, the pancake batter may conveniently be applied as one or more longitudinal sheets on to a steel belt conveyor heated from below by short wave infrared radiation, this apparatus being described in our co-pending European Patent Application No. 82109147.7. After baking, the pancake sheets are transferred to the conveyor belt used for filling, cutting and folding and after the folding operation, the folded pieces are transferred to the rolling device.

After rolling, the products may be deep-frozen or packed into cartons.

The present invention also provides an apparatus for cutting and folding a sheet of pastry material into discrete pieces of a predetermined size which comprises a conveyor belt above which is positioned an oscillating knife having a cutting edge extending laterally across the width of the conveyor belt, means for feeding a sheet of pastry material onto the conveyor belt, means for controlling the movement of the knife so that it contacts and cuts through the advancing pastry sheet by means of its cutting edge and then ascends and rotates in a direction such that the motional vector of the cutting edge is counter to the conveying direction causing the forward edge of the pastry sheet to be lifted up and folded over, and then descends and rotates in the reverse direction so that the cutting edge contacts and cuts through the advancing pastry sheet behind the folded portion to separate a folded piece from the remainder of the pastry sheet.

The present invention is further illustrated by way of example with reference to the accompanying drawing in which FIG. 1 is a side plan view (partly in section) of an apparatus of the present invention.

The apparatus of the present invention comprises a frame 10 on which is mounted a movable carriage 11 at an angle of 30° to the horizontal, which is operated by an air cylinder 12 to reciprocate in a direction controlled by a guide 13 on the movable carriage 11 and guide wheels 14 fixed to the frame 10. Fitted to the front end of the carriage is an oscillating shaft 15 firmly attached to which is a knife 16 with a cutting edge 17. Mounted on the rear end of the carriage is a rotary air cylinder 18 having a shaft 19 to which is fitted a drive wheel 20. A timing belt 21 is trained around drive wheel 20 and shaft 15 and imparts an oscillating movement to the shaft 15. A hand wheel 22 aided by hinged arm 23 can adjust the height of the knife. Below the movable carriage runs a conveyor belt 24 on which is distributed a layer of pancake material 25 having a thickness of 2 mm on which is dosed a suitable amount of filling 26 intermittently at regular intervals by conventional means (not shown). The portion of the apparatus shown by dashed lines indicates the position of the apparatus at the point where the knife cuts through the pancake (Position B). The movement of the apparatus is closely synchronised with the movement of the pancake material on the belt by means of a sequency controller, Omron Sysmac PO, manufactured by Omron Tateisi Electronics Co.

In operation, a sheet of pancake material 25 was fed from a batter applicator onto a sheet belt conveyor heated from below by short wave infrared radiation described in our copending European Patent Application No. 82109147.7 (not shown). The pancake material was baked and then transferred via rollers (also not shown) to the conveyor belt 24. Portions of filling 26 were dosed intermittently at regular intervals onto the surface of the pancake material. When the pancake material 25 and the filling 26 are in the appropriate position, a photocell (not shown) is activated whereupon the carriage 11 moves downwards in the direction of the arrow C and at the same time, the knife 16 rotates 90° from the horizontal position A to position B so that it points downwards at the end of the movement when it contacts and cuts through the pancake material by means of its cutting edge 17. Immediately afterwards the carriage travels in the reverse direction (Arrow D) while at the same time the knife rotates in the opposite direction causing the forward edge of the cut pancake material to be folded over the filling to give a semi-rolled pancake 27. When the knife reaches position A the cycle recommences and another piece of pancake material is cut and folded over. The pancakes are completed by transfer of the semi-rolled pancakes to a separate conventional conveyor and roller (not shown).

We claim:

1. An apparatus which comprises a conveyor means, means for feeding a pastry material in a sheet onto the conveyor, a knife capable of oscillating and having a cutting edge positioned above the conveyor such that the cutting edge of the knife extends laterally across the width of the sheet of pastry and the conveyor, and means for controlling the movement of the knife such that
   (a) the cutting edge contacts and cuts through the pastry sheet which advances on the conveyor, and
   (b) the knife then raises and rotates about its longitudinal axis in a direction such that the motional vector of the cutting edge is counter to the downstream direction of the conveyed sheet of pastry material and maintains contact with and lifts up and folds over and then releases the forward edge of the pastry sheet onto the advancing pastry sheet, and
   (c) the knife then descends and rotates in the reverse direction so that the cutting edge is in a position to again contact and cut through and fold the advancing pastry sheet behind the advancing cut and folded portion.

2. An apparatus according to claim 1 wherein the angle through which the knife rotates is at least 60°.

3. An apparatus according to claim 1 wherein the angle through which the knife rotates is from 75° to 120°.

4. An apparatus according to claim 1 wherein the means for controlling the movement of the knife comprises a movable carriage having means to fit the knife on the carriage and means to reciprocate the carriage along a path oblique to the conveyor and means to reciprocate the rotation of the knife.

5. An apparatus according to claim 4 wherein the means to reciprocate the carriage oblique to the conveyor is such that when the cutting edge of the knife ascends and rotates, the carriage travels counter to the conveying direction and such that when the cutting edge of the knife descends and rotates, the carriage travels in the opposite direction.

6. An apparatus according to claim 5 wherein the movable carriage reciprocates relative to the conveyor at an angle from 10° to 50°.

7. An apparatus according to claim 5 wherein the movable carriage reciprocates relative to the conveyor at an angle from 20° to 40°.

8. An apparatus according to claim 1 further comprising a rolling device communicating with the downstream end of the conveyor.

9. An apparatus according to claim 8 wherein the rolling device comprises a conveyor having a roller mounted transversely above the conveyor.

10. An apparatus according to claim 1 wherein the conveyor is heated from below by infrared radiation.

* * * * *

UNITED STATES PATENT AND TRADEMARK OFFICE
CERTIFICATE OF CORRECTION

PATENT NO. : 4,640,670

DATED : February 3, 1987

INVENTOR(S) : Anders G. Svengren, et al.

It is certified that error appears in the above-identified patent and that said Letters Patent is hereby corrected as shown below:

Column 1, line 39, "conveyor" should read --conveying--.

Column 2, line 41, "rolled" should read --rolling--.

Column 3, line 44, "sheet" should read --steel--.

Signed and Sealed this

Thirty-first Day of March, 1987

Attest:

DONALD J. QUIGG

*Attesting Officer*     *Commissioner of Patents and Trademarks*